United States Patent [19]

Larsen

[11] Patent Number: 5,115,500
[45] Date of Patent: May 19, 1992

[54] PLURAL INCOMPATIBLE INSTRUCTION FORMAT DECODE METHOD AND APPARATUS

[75] Inventor: Larry D. Larsen, Raleigh, N.C.

[73] Assignee: International Business Machines Corporation, Armonk, N.Y.

[21] Appl. No.: 142,585

[22] Filed: Jan. 11, 1988

[51] Int. Cl.$^5$ .................. G06F 9/34; G06F 12/04; G06F 9/30; G11C 8/00

[52] U.S. Cl. .................. 395/425; 395/400; 395/375; 365/230.06

[58] Field of Search ... 364/200 MS File, 900 MS File

[56] References Cited

U.S. PATENT DOCUMENTS

| | | | |
|---|---|---|---|
| 4,455,602 | 6/1984 | Baxter, III et al. | 364/200 |
| 4,499,535 | 2/1985 | Bachman et al. | 364/200 |
| 4,499,604 | 2/1985 | Clancy et al. | 364/200 |
| 4,514,800 | 4/1985 | Gruner et al. | 364/200 |
| 4,517,642 | 5/1985 | Ahlstrom et al. | 364/200 |
| 4,782,461 | 11/1988 | Mick et al. | 364/900 |
| 4,791,557 | 12/1988 | Angel et al. | 364/200 |
| 4,800,523 | 1/1989 | Gerety et al. | 364/900 |

*Primary Examiner*—Alyssa H. Bowler
*Attorney, Agent, or Firm*—Edward H. Duffield

[57] ABSTRACT

Architectural design of processor apparatus and its method of operation permit normally incompatible plural format process instructions for dissimilar processors to be placed intermixed in the instruction storage of a single machine but to be accurately decoded and executed properly regardless. Instructions in different formats which are normally incompatible which may have been written for different machine types are placed in predefined or segregated areas of the instruction store. Instructions are fetched and decoded by the processor for execution in a manner which uses portions of both the fetched-from address in the instruction store and the instruction itself. Decoding is thus determined in part by where in the instruction store the instruction resided when fetched, and the specific instruction itself. This approach is compatible with both ordinary processor architecture and with pipelined processor architectures.

7 Claims, 7 Drawing Sheets

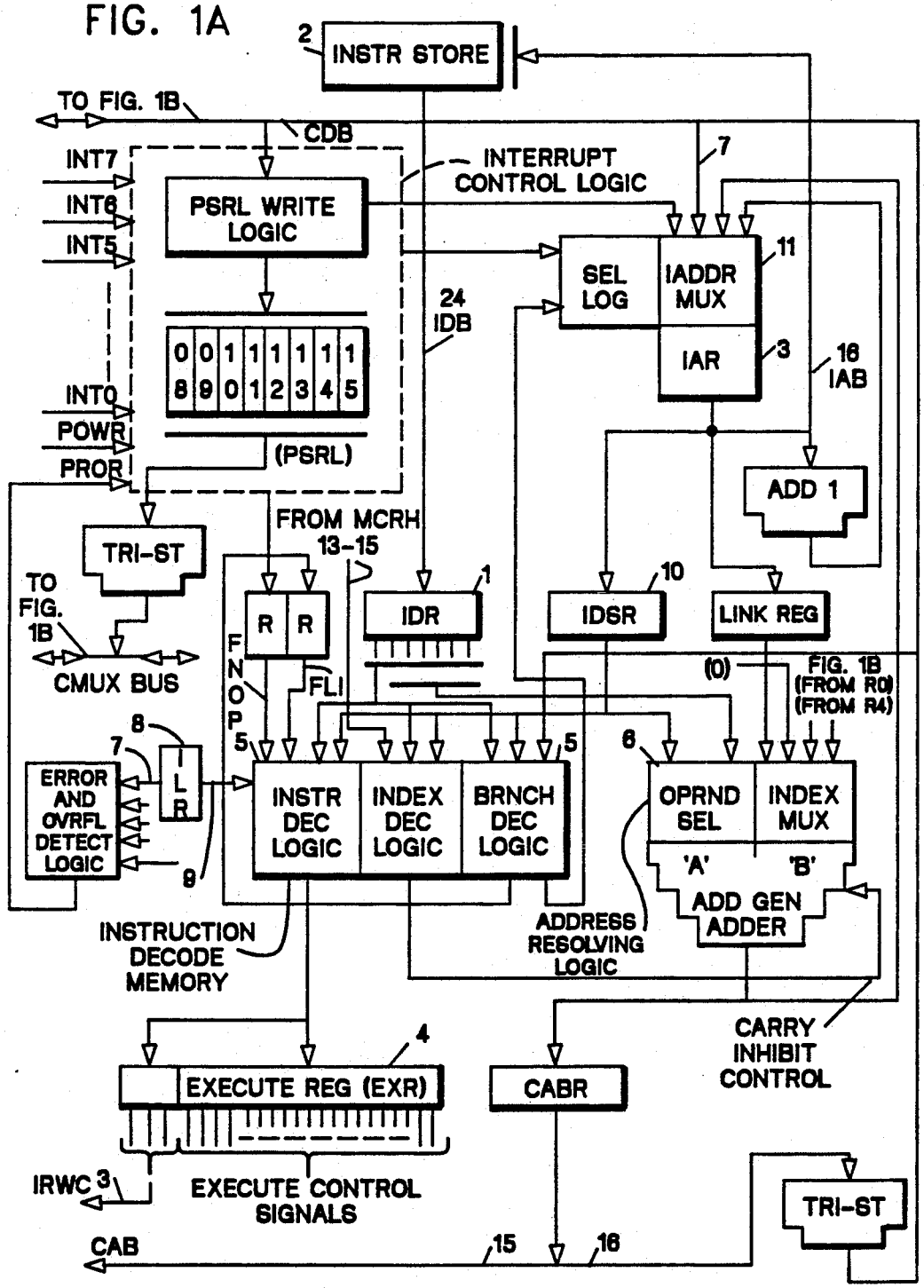

FIG. 3

```
|←————————— TYPE 1 INSTRUCTION BITS —————————→|
| 0 0 0 0 0 0 0 0 0 0 1 1 1 1 1 1 1 1 1 1 2 2 2 2 |
| 0 1 2 3 4 5 6 7 8 9 0 1 2 3 4 5 6 7 8 9 0 1 2 3 |
| 0 1 1 1 | 0 0 1 0 | 0 1 1 0 | 0 0 1 1 | 1 0 0 0 | 0 0 0 0 |  (HEX 226380)
```

```
|←———— TYPE 2 INSTRUCTION BITS ————→|
| 0 0 0 0 0 0 0 0 0 1 1 1 1 1 |
| 0 1 2 3 4 5 6 7 8 9 0 1 2 3 4 5 |
| 0 0 0 1 | 1 0 1 0 | 0 0 1 1 | 0 0 1 0 |  (HEX 1A32)
```

PLURAL INCOMPATIBLE INSTRUCTION FORMAT DECODE METHOD AND APPARATUS

FIELD OF THE INVENTION

This invention relates to computer processor architecture and operational methods in general, and in particular to instruction decoding and execution elements within such processors.

PRIOR ART

The instruction format divergence or compatibility problem is fairly well known. Several general strategies have evolved for dealing with this compatibility problem. One purely software solution involves writing programs in high level language for compilation specifically for the machine which is to run the program. Thus, programs must be recompiled into machine language code for each new machine required to run them. A library of tested programs or algorithms can be built up over time and can be migrated to new machines by recompiling them. This approach necessarily involves the use of a compiler or translator which, of course, must be written for each new machine. This is a substantial effort in most instances, and in the end does not permit incompatible instruction formats to reside in the same machine because the instructions compiled for a given machine are compatible with, and are in the format of, that specific machine alone.

One general architectural approach to resolving the compatibility problem involves reservation of a bit or some bit combination in the instruction format for the machine that is to run the program. The extra bit or bit combinations are utilized to flag instructions which are non-native format for the machine. Whenever such a flag combination is encountered, the instruction containing it can be decoded using different rules from the native instruction decode rules. This scheme allows non-native instructions to be located anywhere in the instruction store, but does so at the expense and inconvenience of lengthening the native instruction word by adding the additional bit or bit combinations. This has the effect of using up available instruction decode permutations that might otherwise be used for more beneficial purposes within the machine.

Another architectural approach, which is related to the previously discussed one, is to establish an instruction type mode switching control, which may be operated by executing a particular instruction. The purpose of the "switch" instruction is to permit the programmer to switch the host machine's instruction decoding mode from one type to another when moving among instructions of various types or formats. This requires that the "switch" instruction be included in all subroutine or subprogram entry and exit points which adds unnecessarily to the complication of writing programs and increases the amount of program storage required.

Yet another technique for achieving compatibility is to use some form of variable decode logic to contain the specifications for decoding the machine instructions. This involves the use of advanced assemblers to produce the instruction decode tables that are to be written in the variable decode logic. Using this approach, a programmer may tailor an instruction set to suit the application or task which is to be programmed. This approach also provides a means for allowing machine language programs written in one format for one type of machine to be run in another type of machine which is not normally compatible with the first machine's instruction format. However, the technique does not permit mixing of machine language instruction types or formats in a single machine.

OBJECTS OF THE INVENTION

In view of the foregoing difficulties and shortcomings of the known prior art approaches, it is an object of this invention to provide an improved data processing architectural structure and method of operation in which instructions from two or more incompatible format machines may be placed simultaneously in instruction storage of a single machine and yet be decoded and executed properly. This and other objects not enumerated specifically will be apparent in the discussion which follows detailing a preferred embodiment of the invention and giving several useful examples of its implementation.

BRIEF SUMMARY

In the present invention, instructions from different machine types that are written in different formats that are normally incompatible, may be placed or intermixed in the instruction storage of a single machine and still may be decoded and executed properly. The instructions, as loaded, are segregated or mapped into areas of the instruction store which are uniquely associated with containing instructions of a given format or type. Either specific regions of the instruction store may be reserved for each type or format of instruction, or instruction types identified to the link editor may be loaded and a table or map maintained of the locations in storage and the format type of instruction that is contained therein. The instructions may be then fetched sequentially in normal mode for decoding and execution in the machine. This is facilitated by utilizing a portion of both the fetched-from address in instruction storage, from which the instruction to be decoded was fetched, and the instruction itself which normally contains one or more fields of information that define the type of operation to be performed, i.e., executed in the machine. The decoding operation is thus determined in part by where in instruction store the instruction resided, as well as by portions of the instruction itself, as is the usual case. This technique and construction allows normally incompatible format or instruction types from two or more machines to be intermixed in the instruction store without requiring extra instruction format bits to identify non-native instructions. It does not require type or mode switch instructions to be inserted in the instruction stream by the programmer. Overall, instructions for a machine of this type consume less instruction space than other approaches.

BRIEF DESCRIPTION OF THE DRAWINGS

The invention will be described with reference to a preferred embodiment thereof which is further illustrated in the drawings in which:

FIG. 3 illustrates two different instruction formats for the same operation as typical examples of two incompatible instruction formats that may be executed to perform the same operation in the processor.

DESCRIPTION OF PREFERRED EMBODIMENT

Figure 1B:
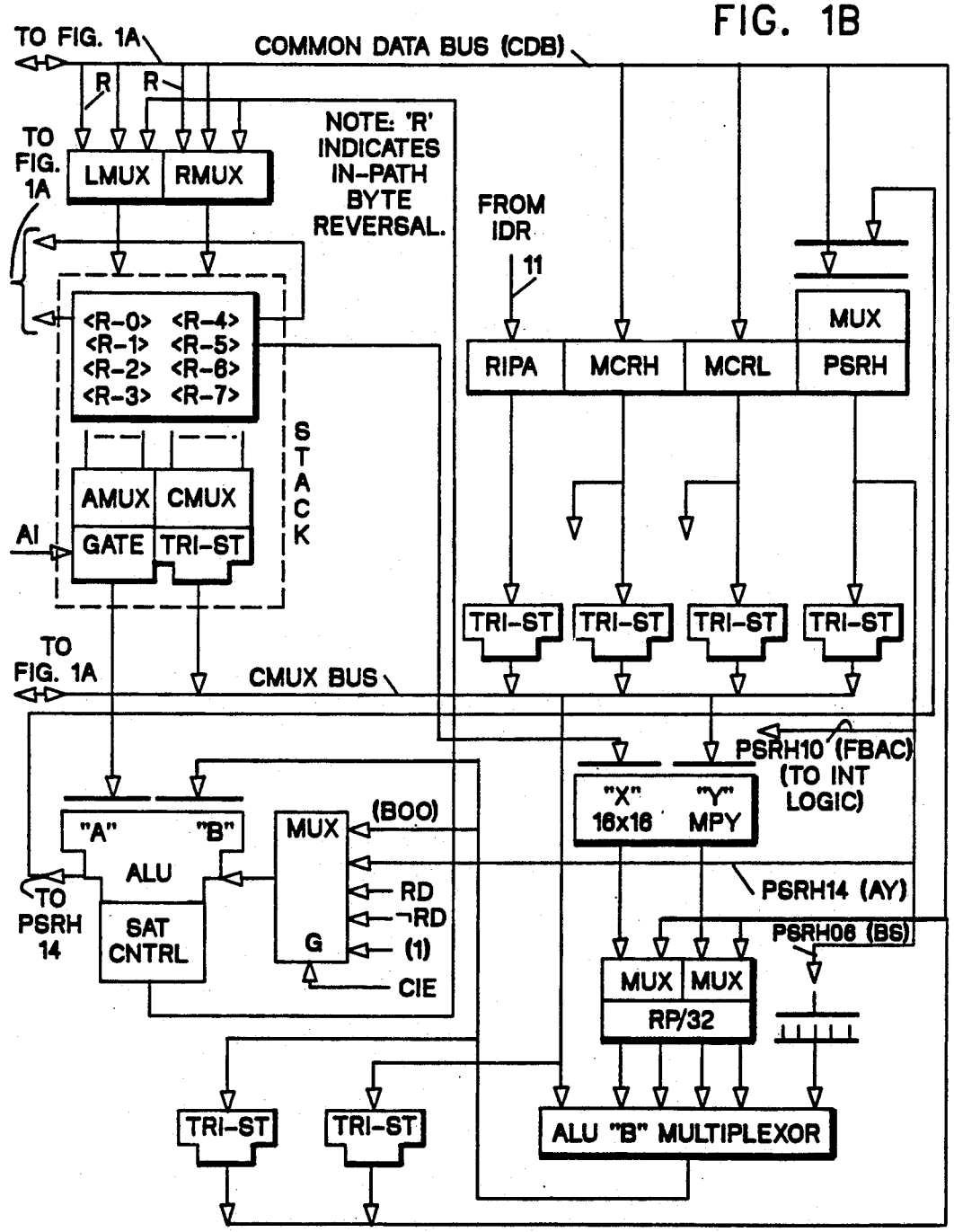
FIG. 1, consisting of FIGS. 1A and 1B, illustrates an exemplary three-phase pipelined processor architecture and structure utilizing additional components that facilitate the decoding operation as defined for the invention.

A three-phase pipelined data processor architecture is illustrated in the descriptions which follow. In this architecture, an instruction is first fetched on one cycle, decoded in the second cycle and executed in the third cycle by the processor's arithmetic logic unit. Instructions reside in the instruction store 2 in FIG. 1 and are fetched into the instruction decoding register 1 for decoding by the instruction decoding logic. The decoding logic, which may consist of some form of memory or may be implemented in a more conventional way using standard logic elements (i.e., ANDS, ORs, etc.), is used to transform fetched instructions to a form appropriate to operate the gates and controls of the processor flow logic in such a way that the desired instruction execute actions take place. The transformed instruction is then placed in the Execute Register 4, at the end of decode phase. The instruction address register 3 provides the next instruction address to instruction store 2 over the instruction address bus IAB. Instructions are sequentially fetched and placed in the instruction decode register 1 and portions of the instruction are examined in the address resolving logic 6 which contains logic that defines which field or fields of the instruction are to be used and (perhaps) modified to produce an effective address or direct operand value. In the example shown in FIG. 2, decode tables in the instruction decoding memory or logic 5 may be loaded externally on line 9. This may provide the loading of specific instruction decoding rules as will be later described.

The basic ideas presented in this type of structure and architecture apply equally well to the non-pipelined architectural designs for processing machines as well. This will be readily appreciated by those of skill in the art, and while the preferred embodiment discussed utilizes a pipelined architectural design, this is only for convenience in describing the invention, but has no direct bearing upon the present invention.

In FIG. 1, the instruction decode register 1, abbreviated IDR, is shown. The IDR is the register into which instructions fetched from the instruction store, called I-store 2, are placed to be decoded. Instructions taken from, or "fetched" from, the I-store 2 are placed in the IDR where they are held for decoding. The instructions are stored in the IDR prior to being decoded in the instruction decoding logic or memory 5. The instruction address register 3, abbreviated IAR in FIG. 1, is used to contain the I-store 2 address for the instruction that is to be fetched. The execution register 4, abbreviated EXR, contains decoded instructions which are the execution process codes for the specific machine. Instruction decoding logic elements comprising the instruction decode memory or logic as explained earlier, with its contained logic, and the address resolving logic 6 are utilized for decoding the instructions that reside in the IDR 1. The address resolving logic extracts specific bits from the instruction in the IDR, based upon the instruction type, and then causes an effective address or immediate operand value to be calculated by adding (for example) the contents of some index register (R0 or R4 in FIG. 1B).

In the example illustrated in FIG. 1, I-store 2 is assumed to be separate from a data store (not shown) and is thus a "harvard" architectural design for the machine. Loading instructions into I-store 2 may be accomplished previously by loading or writing a ROM or RAM chip with the instructions outside of the host machine. Alternatively, I-store is RAM, and may be written using special instructions in the host processor repertoire for this purpose. When this is done, the path is via IDB with IAR providing the write address.

In the example shown, the pipelined processor operates in such fashion that instructions fetched from the I-store 2 are placed in the IDR 1 at the end of a fetch cycle. This corresponds to the start of a decoding cycle. Then, during the decoding cycle, the instruction contained in the IDR 1 is recorded to a new form appropriate for execution by the processor. Simultaneously, the address resolving logic 6 extracts the appropriate instruction bits and calculates an effective address or immediate value. The end of the decoding cycle, which results in the loading of the decoded bits into EXR 4 and resolved address or immediate value data into the CABR, represents the start of the execution cycle. The pipelined processor phases thus overlap: while one instruction is being fetched, the instruction previously fetched into the IDR is being decoded and an instruction previously decoded into the EXR 4 is being executed.

The instruction decode logic in FIG. 1 is shown as contained in instruction decode memory IDM 5. In the arrangement shown, some or all of the bits from the instruction being decoded in the IDR 1 are used as a portion of the address utilized to look up a decoded instruction code. Which specific bits or fields of the IDR are used in the resolved address is determined by the address resolving logic 6 as will be described later in greater detail. The content of the instruction decode memory IDM 5 at any particular address is, in fact, the execution code for a particular decoded instruction. As shown in FIG. 1, a path 9 for loading the contents of the IDM 5 with decode information codes may be included, although this is not generally present in most machines. The usual case in other machines is for the instruction decode memory to be contained in the form of read-only memory and written only once. Of course, memory is not the only way for containing instruction decode specifications since hard-wired logic configurations are often used, but it is easier to visualize the concepts utilizing read/write memory as in this illustration.

The general concept of placing instruction decoding tables in memory is extended in the present invention to permit placing instructions in various normally incompatible machine languages or formats into the instruction store, and yet allow for proper decoding. The overall object is to permit the programmer to mix or co-mingle in memory the existing machine language formats or programs that may have originally been written for two or more different machine types and to permit execution of all of the code on a single processor without modifying or recompiling the programs. In order to achieve this result, a single program which may consist of process instructions or entire sub-routines or code modules from dissimilar machines and in dissimilar or incompatible formats, must be link-edited. The well known function of the link editor program, not shown but well known to those of skill in the art, is to assign separately identified or otherwise segregated or mapped locations in the I-store 2 to the various portions of machine language code being used. This may be easily accomplished by reserving major segments, for example the high order address locations, for one language or format instruction type and the remaining segments in I-store for other languages or formats. An example of this follows later.

The technique used in the present invention is represented as an extension of the basic concept of utilizing an instruction decode memory for containing instruction decode specifications or execution codes. This has been done for convenience in explaining the architecture and method of operation, but is not an essential portion of the idea since other forms of instruction decode logic are well known. The purpose of having a loadable instruction decode memory 5, as shown in this illustration, is to permit tailoring of the instruction set to any specific programming application. The implication is that each new program application will require its own unique decoding or execution code table. If, as is done in the present example, the machine is designed to accommodate and to decode and execute machine level instructions for two or more different or incompatible processors, the instruction decode memory contents will not generally need to be changed for each application. It is only when an additional new instruction set needs to be dealt with that the IDM 5 would have to be loaded with new tables.

Figure 2:
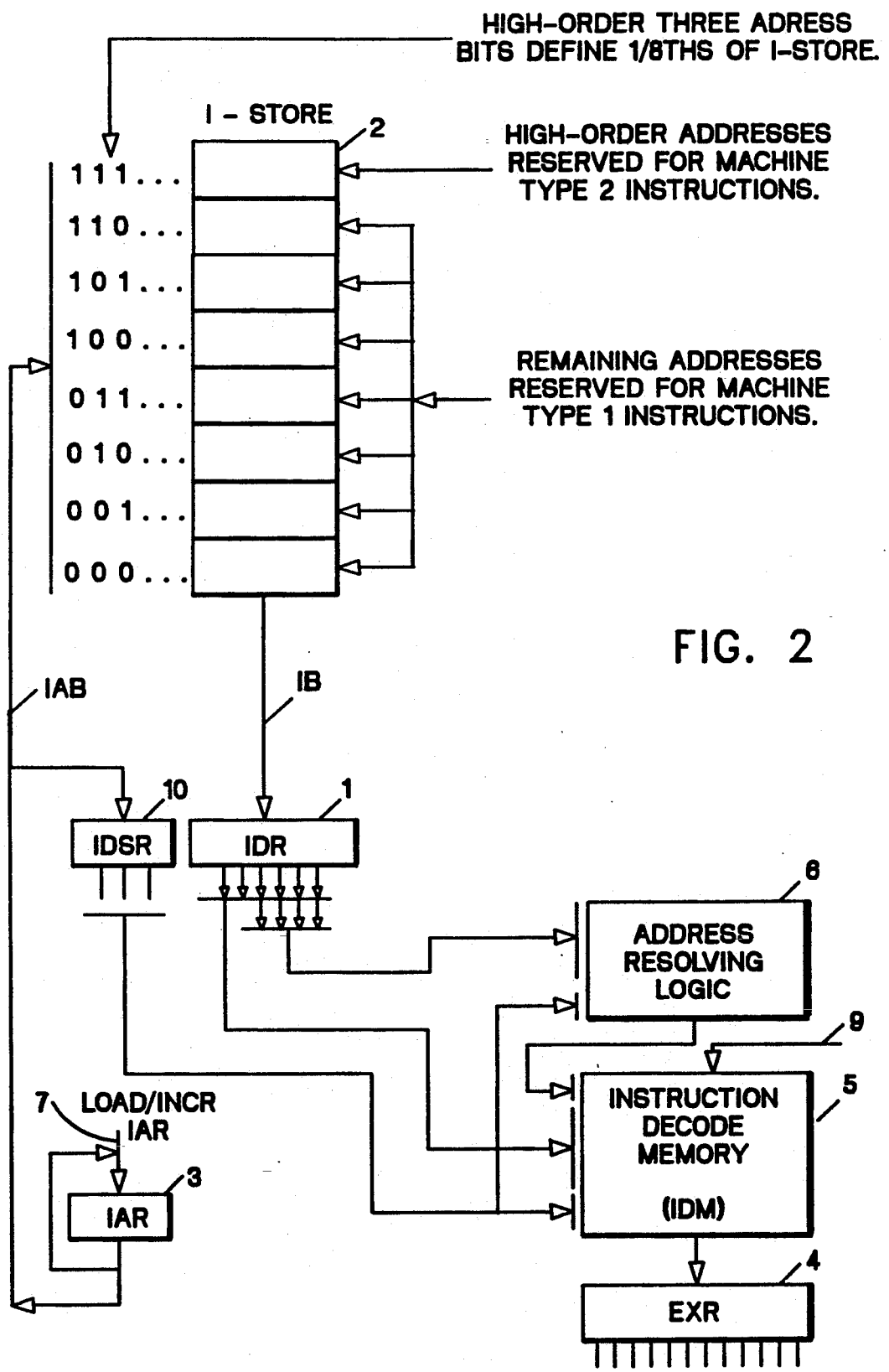
FIG. 2 illustrates the specific additional components and method of operation required in the present invention in greater detail.

FIG. 2 illustrates a block diagram of the major portions of the logic required to accommodate the changes proposed by the preferred embodiment of this invention. The logic shown is similar to that in FIG. 1, but omits the ILR 8 and its loading line 7 for simplicity and includes only the elements necessary for implementing the multiple instruction type decoding of the present invention. In addition, FIG. 2 shows an example of the instruction store 2 with partitioning illustrated for accommodating two types of different, incompatible format machine language instructions. As illustrated, the high order addresses have been arbitrarily reserved for machine type or format 2 instructions. These are identified as having the high order address beginning with 111 in binary and reserve ⅛ of the instruction store total capacity for machine type 2 instructions. The remaining addresses are arbitrarily reserved for machine type 1 instructions as illustrated.

FIG. 2 illustrates the addition of a new component, the Instruction Decode Selection Register, IDSR, 10. This element is a register that is operated so that it retains the instruction address or some portion thereof of the instruction currently residing in IDR 1. The IDSR 10 is used to trap or retain the address of the last instruction that was fetched from I-store 2. The IDSR 10 retains a portion of the address of the last instruction fetched and will be clocked with the same signal that causes the IDR 1 to be loaded. The retained portion may be all of the address or less if required. Thus, it will always receive the address of the instruction that is loaded into the IDR 1. In FIG. 2, IDSR 10 is assumed to contain only the high order three bits from the IAR 3 because of the arbitrarily assumed partitioning of I-store 2 in the instant example. Only the three high order bits necessary to define which of the eight equal arbitrary segments of I-store or partitions are being addressed.

The contents of IDSR 10 and of IDR 1 are taken together in FIG. 2 to provide a look-up address within the IDM 5. Only specific portions of the undecoded instruction in IDR may be needed according to the format of the instruction being fetched. The other portion of the input address to the IDM 5 is the output from the IDSR 10 which identifies the fetched-from address in I-store 2, or in the instant example, at least the range in which the address lies within I-store 2. Decoding of any specific instruction in the IDR 1 thus depends not only on the contents of the IDR 1 but on the region of the I-store 2 from which the instruction was fetched. This portion of the address is provided by the IDSR 10 output.

IDSR 10 also has an output path to the address resolution logic 6. This is necessary to enable the logic to access the appropriate bit fields from the IDR 1 when an operand or effective address must be formed. In general, there will be no compatibility that can be expected between instruction sets of various machines with regard to the placement within the instruction, and the length of, any operand fields.

The effect of using the fetched-from address, or portion of the address, which defines at least a field within the I-store regions, as a part of the access specifications for decoding the specific instruction that is fetched, is to permit instructions in different regions of I-store 2 to be decoded utilizing different rules. Thus, if a portion of I-store 2 is set aside for "type 2" programs, as is shown in FIG. 2, and if the instruction decode memory 5 is set up in the manner described above, all instructions fetched from the region of I-store 2 that are identified by the three high order address bits 111, will be decoded according to type 2 decode rules contained in IDM 5. and instructions fetched from the type 1 region in the I-store 2 will be decoded in the unique manner required for type 1 instructions. A more specific example is given as follows:

Let us suppose that a "type 1" format or language instruction set requires 24 bit words and that it is desired to execute also "type 2" format or language instructions that arbitrarily utilize 16 bit words, and that the same machine is to be required to handle both types of instructions. For the example presently given, it will be assumed that each type of original machine for which the instruction words were written has an "add registers" instruction in a repertoire of its commands. It is, of course, understood that the function of each command is to cause the contents of arbitrary registers such as R2 and R3 to be added together and the sum placed in an arbitrary register such as R3. It will be assumed further that the instruction formats like those shown in FIG. 3, for example, are utilized. The instruction store will be hypothetically partitioned as shown in FIG. 2, and type 1 instructions would be located somewhere within the lower ⅞ of the addressing space in the I-store 2; type 2 instructions would be located in the upper ⅛ of the address spaces in I-store 2. This is accommodated prior to loading of the instructions into the I-store 2 from an external source through the ILR 8 as shown in FIG. 1 when the instructions have been link edited and examined and have been assigned I-store addresses for loading in accordance with the type of instruction that they represent.

Figure 4:
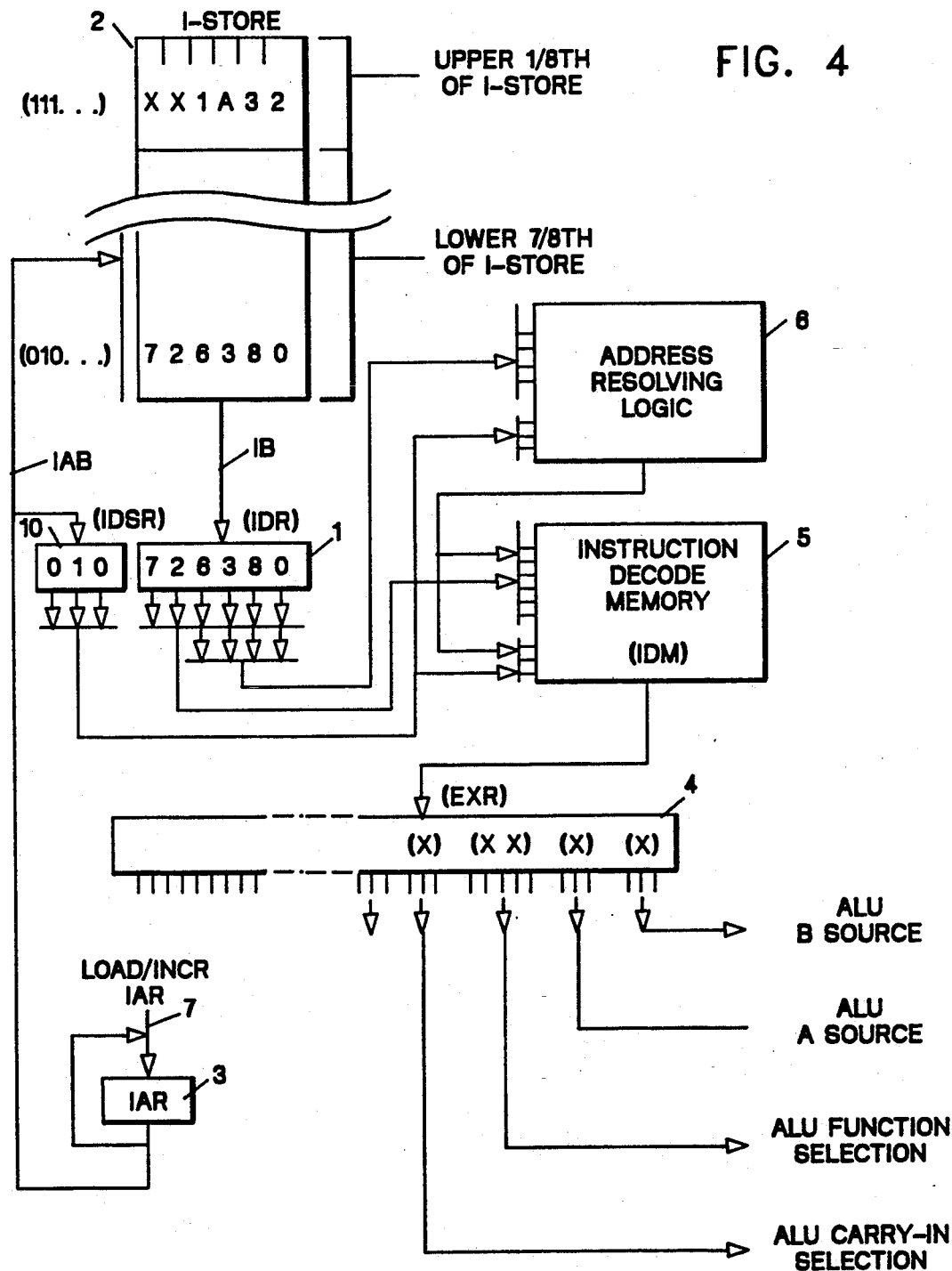
FIG. 4 illustrates a specific example of the operation utilizing a first instruction type format for a given instruction in the apparatus of FIGS. 1 and 2.

When a type 1 add instruction as shown in FIG. 3 is to be executed, it is first fetched from the I-store 2 and placed into the IDR 1. At the same time, the three high order address bits of the location in I-store 2 from which the instruction was fetched will be loaded into the IDSR 10; they will be supplied thereto by the IAR 3. This is the fetching cycle, and when it is complete, the registers that constitute the IDSR 10 and the IDR 1 will contain the specific codes as shown in FIG. 4. These have come from the segment identified by 010 in I-store 2 and have the arbitrary contents identified as 726380, the hexidecimal instruction of a type 1 add register's example as shown from FIG. 3.

Figure 6:
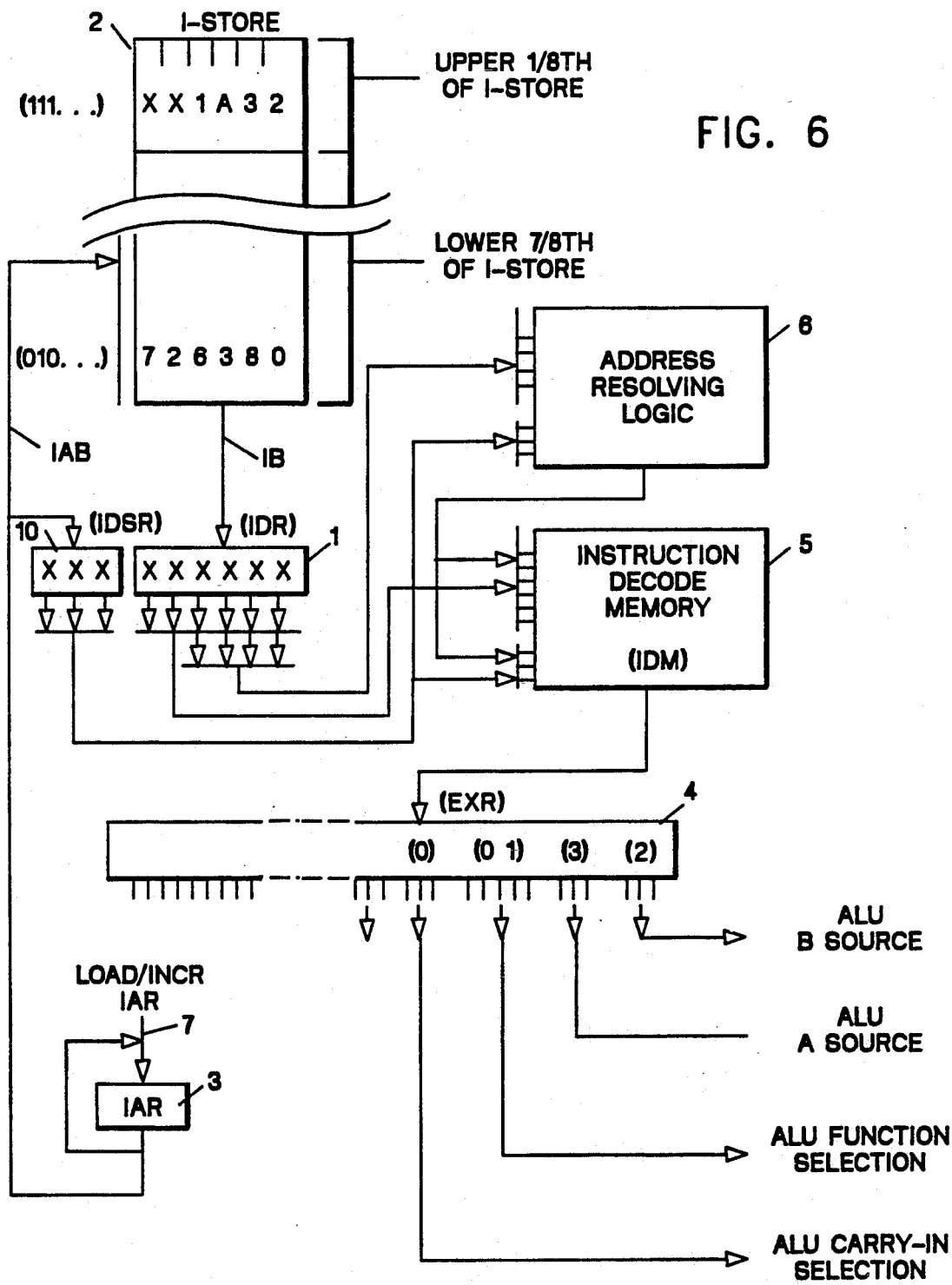
FIG. 6 illustrates the fact that the result of decoding either type of instruction in FIGS. 4 and 5 produces the same results in the execution register portion of the apparatus as depicted.

At this point, the contents of the IDR 1 and the IDSR 10 are taken together to be used as the source of an address for looking up the decode execution code represented by the instruction in the IDM 5. At the end of the decoding cycle, the execution register 4 EXR will be loaded with the decoded instruction codes that were found in the IDM 5 at the location specified by the content of the IDR 1 and the IDSR 10 and IDR 1 and IDSR 10 will be loaded with the next instruction to be decoded and the address in I-store from which it was fetched, respectively. The state of the registers at the start of the execution cycle is indicated in FIG. 6. The contents of the IDSR 10 and the IDR 1 are shown as Xs since, for the execution cycle, the contents of these registers is immaterial. However, the contents of the execution register EXR 4 shows an exemplary decode operation for an add registers operation in which the lower-most EXR register cell contains 2, an identification to the ALU of register 2 which is to be the source of its operand B. The next adjacent cell contains 3 which identifies to the ALU the source of its A operand, in this case register 3. The next field describes the function to be performed by the ALU, in this case 01, meaning an add register and the next field describes the carry-in selection, in this case, 0 for an add register's function.

Figure 5:
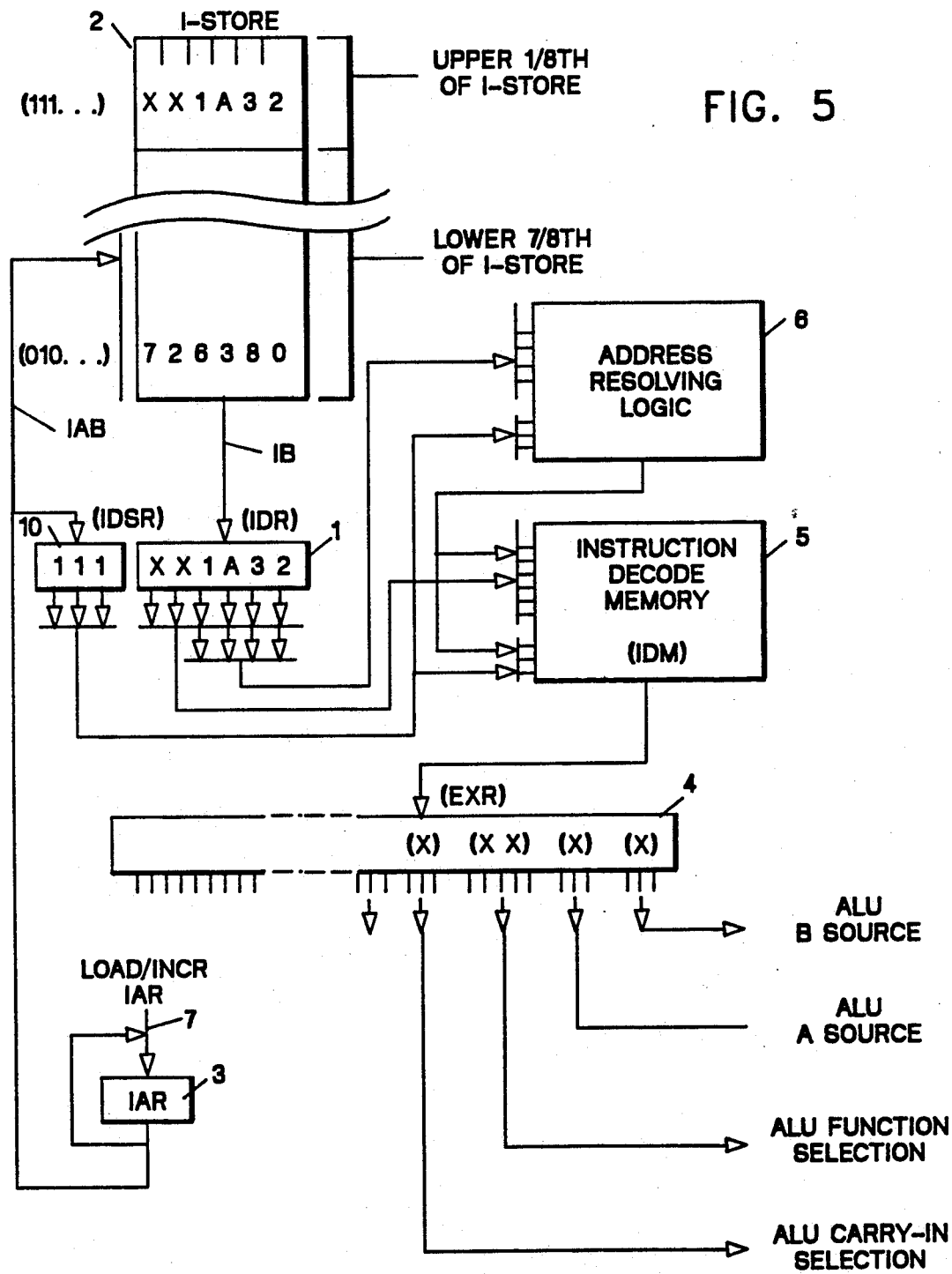
FIG. 5 illustrates another example of a different format for the same type of execution operation in the structure of FIGS. 1 and 2.

Continuing the discussion with regard to operations of the same sort but written in another format, when a type 2 "add registers" instruction is to be executed, then that instruction will be fetched in the normal sequential manner and placed into the IDR 1 just as the type 1 instructions were fetched before. The IAR 3 controls which address within the I-store 2 is next accessed and when type 2 instructions are reached, they will be decoded and executed in sequence as prescribed by whatever program has been written. IDSR 10 will receive the three high order address bits and will thus contain, in the example shown, the binary content 111 as illustrated in FIG. 5. IDR 1 will contain the hexidecimal code as illustrated in FIG. 3 for the add register instruction in the type 2 format which is XX1A32. The register contents for IDSR 10 and IDR 1 are illustrated in FIG. 5. It may be noted that since the type 2 add registers instruction has a word size of only 16 bits in the example assumed, it has been placed in the low order 16-bit positions in the IDR 1 and the high order bits are thus immaterial and are shown as Xs. The address resolving logic 6, upon detecting that the instruction is being fetched from the high order range in I-store 2, a fact that is known to address resolving logic 6 by virtue of the fact that the content of the IDSR 10 is provided to the address resolving logic 6, enables address resolving logic 6 to generate the effective address to be placed in the CABR.

During the decoding cycle that follows the fetching cycle, IDR 1 and IDSR 10 contents, or portions thereof, are used together as the address for looking up the decode of the specific instruction of the type 2 add registers in the IDM 5 logic or memory. It will be noted that the two high order bytes of the IDR 1 will have no part in decoding of the instruction since they do not exist in type 2 instructions. Thus, the address used for IDM 5 will be entirely different from that used for looking up the decode of the type 1 instruction example just given. However, the instruction decode memory IDM 5 will be configured to contain the same pattern of decoded bits. That is, the execution code to be placed in EXR will be identical since exactly the same function is specified by both the type 1 add register's instruction and the type 2 add register's instruction. Therefore, the state of the execution register 4 after the type 2 add register's instruction has been successfully decoded is represented in FIG. 6 as being just the same as it was for the type 1 instruction.

As is evident from the foregoing description of the structure and operation of the present invention, the decode memory table or hardwired logic as used in the present invention will require somewhat greater content to support decodes of multiple instruction types or formats than those that are required to support a single instruction format or type. Also, certain conditions must be met or must pre-exist when multiple types of machine level instructions are to co-exist within a single machine for decoding and execution. The essential conditions are that the machine level instructions for one machine type to be executed directly in another require the executing machine to have at least equivalent data flow path widths and arithmetic logic resources. For example, if a particular instruction directs multiplication to take place, the data flow of the hosting machine must have a multiplier, and the relationship of the multiplier to other necessary arithmetic elements must be similar to those provided in the machine for which the original program was written. Secondly, all instructions that reside in the I-store 2 of the machine must be able to fit within the word size of that I store. Thus, instructions from a 24-bit wide instruction word machine to be executed in a non-native host machine will require that the host machine have at least a 24-bit instruction word size of its own to accommodate those from the first machine. Finally, the address resolving facilities, i.e., the number of index registers, the index adder sizes, etc., for the hosting machine must be adequate to accommodate the effective address and operand formation for the non-native machine instructions as will be evident to those of skill in the field.

Having described the invention with reference to a preferred embodiment thereof, and having clearly explained that both the method and apparatus of the invention may be practiced in other than pipelined machine architectures, it will be apparent to those of skill in the art that numerous departures from the specific embodiment are contemplated and will adequately perform the methods described wherefore what is set forth in the claims which follow are intended to be by way of example only and not by way of limitation.

What is claimed is:

1. A method of decoding for execution normally incompatible plural format process instructions into compatible single format execution codes in a processor, comprising steps of:

fetching sequentially for decoding and execution said process instructions from a first addressable storage means; and decoding sequentially said fetched process instructions for execution in said processor by accessing execution codes stored in a second addressable storage means by utilizing at least a portion of said address in said first addressable storage means from which each said process instruction was fetched together with at least a portion of said fetched process instruction itself as an address for said second addressable storage means.

2. The method as described in claim 1, further comprising the step of:

segregating by format said process instructions into separately identifiable groups of locations in said first addressable storage means.

3. The method as described in claim 1, further comprising the step of:

retaining sequentially the addresses in said first addressable storage means from which said process instructions are fetched.

4. The method as described in claims 1 or 2 or 3, further comprising a step of:

arranging for access the execution codes for each said process instruction in said second addressable storage means, said arranging being done at locations therein that are determined by at least a portion of each said process instruction together with at least a portion of the address in said first addressable storage means wherein said process instruction resides.

5. A data processor having plural and compatible format instruction and decoding execution capability, comprising:

a first addressable storage means acting as an instruction store, said instruction store containing instructions in two or more incompatible formats for execution in said processor; and a second addressable storage means acting as an execution code store, the contents of said execution code store being arranged to be addressed for each said instruction in said instruction store by an address utilizing at least a portion of said instruction together with at least a portion of the address in said instruction store at which said instruction resides.

6. A data processor having execution capability for plural and compatible format instructions, comprising:

means for fetching sequentially for decoding and execution process instructions from a first addressable storage means; and means for decoding sequentially said fetched process instructions for execution in said processor, said means for decoding including decoding logic means, and decoding said fetched process instructions in said logic means by utilizing at least a portion of the address in said first addressable storage from which each said instruction was fetched together with at least a portion of said fetched process instruction itself as the logic input for said decoding logic means.

7. Apparatus as described in claims 5 or 6 further comprising:

means for retrieving sequentially the addresses in said first addressable storage means from which said process instructions are fetched.

* * * * *